Jan. 20, 1959  C. R. HAGEN  2,869,306
COTTON HARVESTER
Original Filed Sept. 30, 1954  5 Sheets—Sheet 1

INVENTOR
CLARENCE R HAGEN.
ATTORNEY

Jan. 20, 1959    C. R. HAGEN    2,869,306
COTTON HARVESTER
Original Filed Sept. 30, 1954    5 Sheets-Sheet 2

INVENTOR
CLARENCE R. HAGEN
Paul O. Pippel
ATTORNEY

INVENTOR
CLARENCE R HAGEN
ATTORNEY

Jan. 20, 1959 C. R. HAGEN 2,869,306
COTTON HARVESTER
Original Filed Sept. 30, 1954 5 Sheets-Sheet 4
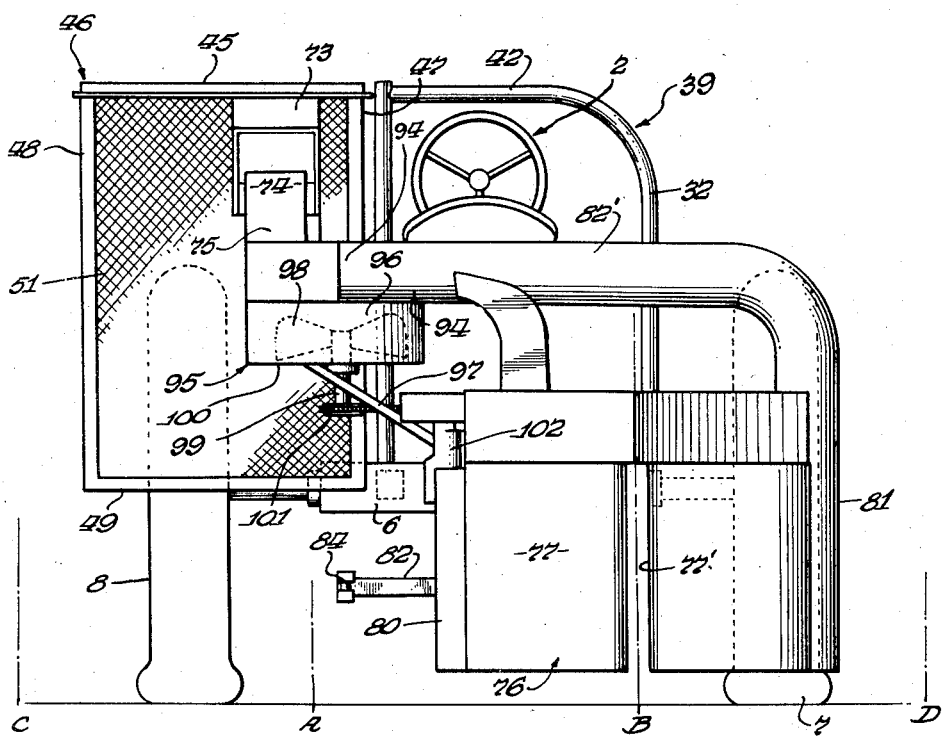
INVENTOR
CLARENCE R. HAGEN
ATTORNEY

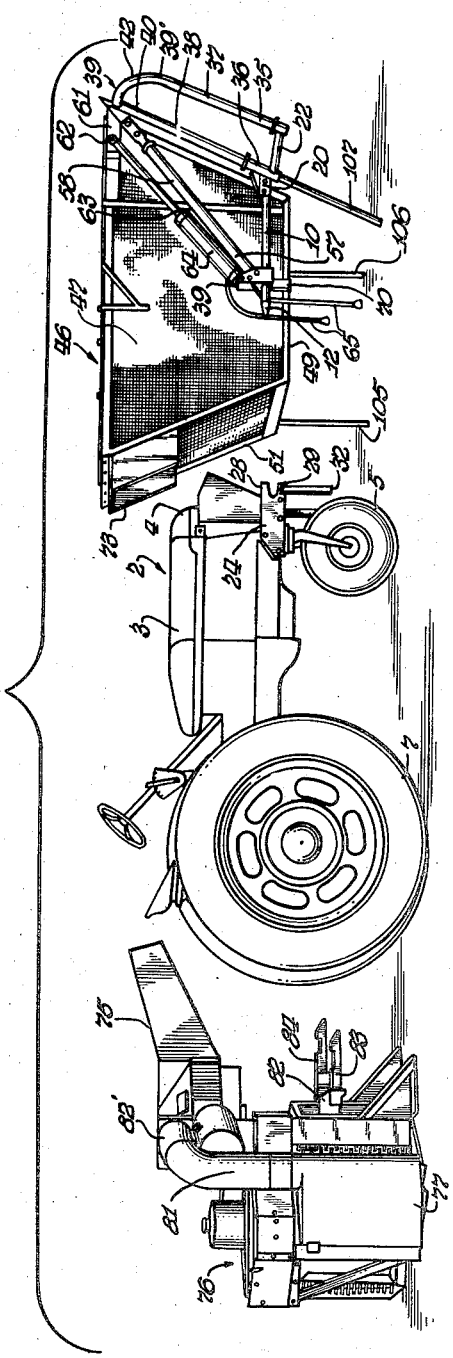

United States Patent Office 2,869,306
Patented Jan. 20, 1959

2,869,306

COTTON HARVESTER

Clarence R. Hagen, Grand Rapids, Mich., assignor to International Harvester Company, a corporation of New Jersey Original application September 30, 1954, Serial No. 459,475. Divided and this application March 1, 1957, Serial No. 643,364

3 Claims. (Cl. 56—14)

This invention relates to mounting structures for adapting cotton harvesters to conventional agricultural tractors or similar vehicles and is a divisional application of U. S. application Serial No. 459,475 filed September 30, 1954 in the name of Clarence R. Hagen for Cotton Harvester.

The usual agricultural tractor is designed for use in propelling and partially or wholly supporting numerous machines and implements, but as a rule is not ordinarily intended for superposition thereon of large harvesting units such as cotton pickers.

It is well understood that in agricultural tractors, the rear axle structure is more suitable to carry the heavy loads and that the front end of the tractor should be relatively lightly loaded so that it is easier to control. In this connection, it is an object of the present invention to locate the cotton picker component rearwardly of the rear axle in counter-balancing relation to the cotton receptacle which is positioned ahead of the rear axle and at the side of the tractor opposite that of the cotton picker to obtain lateral balance.

Another object of the invention is to provide a novel auxiliary framework for supporting the picker basket in a low position just above the cotton plants so as to obtain a low center of gravity and at the same time provide a high pivot point about which the basket is to be rotated for dumping into a wagon box and to arrange this pivot on an axis generally parallel to the rear axle structure so that when the basket is elevated with the load of cotton it will be balanced across the strongest part of the tractor and without imposing excessive weight on the tractor front steering wheel assembly.

A still further object is to provide a novel readily disconnectible attachment for the tractor to the cotton picker which accommodates separation simply by unlatching the connection and moving the tractor and the basket longitudinally, the picker and tractor being similarly connected and separable.

A further object is to design the basket and support framework so as to obtain maximum basket capacity and also facilitate dumping from the front end of the tractor-harvester combination by angling the front side of the basket downwardly and rearwardly from the upper forward end of the basket to provide an accommodation spaced beneath the forward upper end of the basket for a wagon box.

These and other objects of the invention will become more apparent from the specification and the drawings, wherein:

Figure 4 is a rear end view thereof;

Figure 5 is an enlarged plan view of the mounting for the rear end of the basket frame support beam;

Figure 6 is an enlarged front view of the basket support; and

Figure 7 is a side elevational view showing a side elevational view of the tractor, the picker unit and basket separated.

Figure 3:
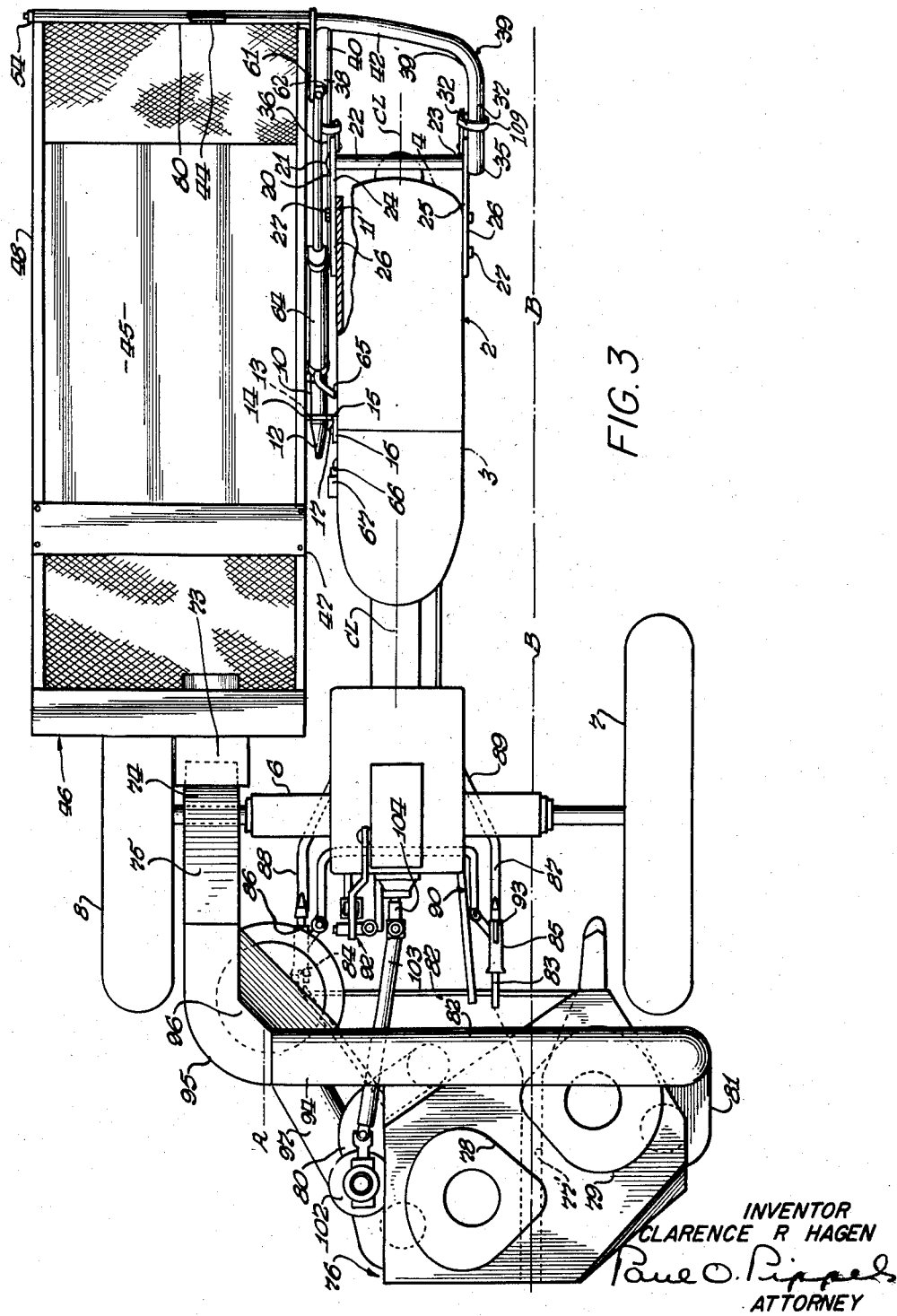
Figure 3 is a plan view thereof.

The invention is shown in association with an agricultural tractor generally indicated 2, and comprising a narrow fore and aft extending body or frame structure 3 having a front end part 4 with a sustaining front steering truck 5, the body being centered on the center line CL—CL between left and right rows of cotton indicated A and B in Figure 3. The rear end part of the tractor body is integrally connected to a transverse rear axle structure 6 which journals right and left large traction wheels 7 and 8 which are adapted to straddle and travel respectively closely along the right and left-hand sides of the two rows A and B. The tractor is provided along the left and front sides thereof with a basket or cotton receptacle mounting frame generally indicated 9 which comprises an elongated frame beam member 10 extending in a fore and aft direction along the side sill 11 of the tractor body and having a pointed rear end or extremity 12 which is entered through a socket or a fore and aft extending opening 13 in a vertical outwardly extending flange or plate 14 of a mounting bracket 15 which comprises a mounting flange 16 formed integral with the flange 14 and extending generally parallel to the side sill 11 and adapted for connection by means of bolts 17 to an adjacent rear portion of the tractor body, normally, the clutch housing 18.

The forward end 19 of the beam 10 projects in front of the forward extremity of the tractor body and is connected through a gusset plate assembly 20 with one end 21 of a cross-beam member or element 22 which extends with the member 10 in a substantially horizontal plane. The beam 22 projects transversely of the tractor body at approximately the level of the side sills and adjacent to opposite ends 21 and 23 is detachably supported by brackets 24 and 25 from the forward part of the tractor.

Each bracket 24 and 25 is identical in construction and comprises a plate 26 which is attachable by means of bolts 27 to the adjacent sill member 11 in an upright plane, the plate extending forwardly of the tractor flatwise in a fore and aft direction and having upper and lower vertically spaced ears or lugs or projections 28 and 29 which define a horizontally elongated slot 30 with a forwardly open end 31 adapted to receive the transverse bar 22 therein coincident with the insertion of the rear extremity 12 of member 20 through the opening 13 attendant to mounting the frame 9 on the tractor.

Each bracket 24 and 25 has a latch 32 associated therewith for securing the crossbar, the latch comprising an elongated bar assembly 33 pivoted on a horizontal pin 34 to the lower lug 29 of the bracket and adapted to be swung upward across the lugs 29 and 28 in closing relation to the forward end 31 of the slot to retain the bar 22.

The ends 21 and 23 are connected to the lower ends 35 and 36 of upright beams 37 and 38 of a supplementary frame generally indicated 39, the elements 37 and 38 extending upwardly and forwardly from member 22 in a diagonal transverse plane as respects the centerline CL—CL of the tractor.

Figure 2:
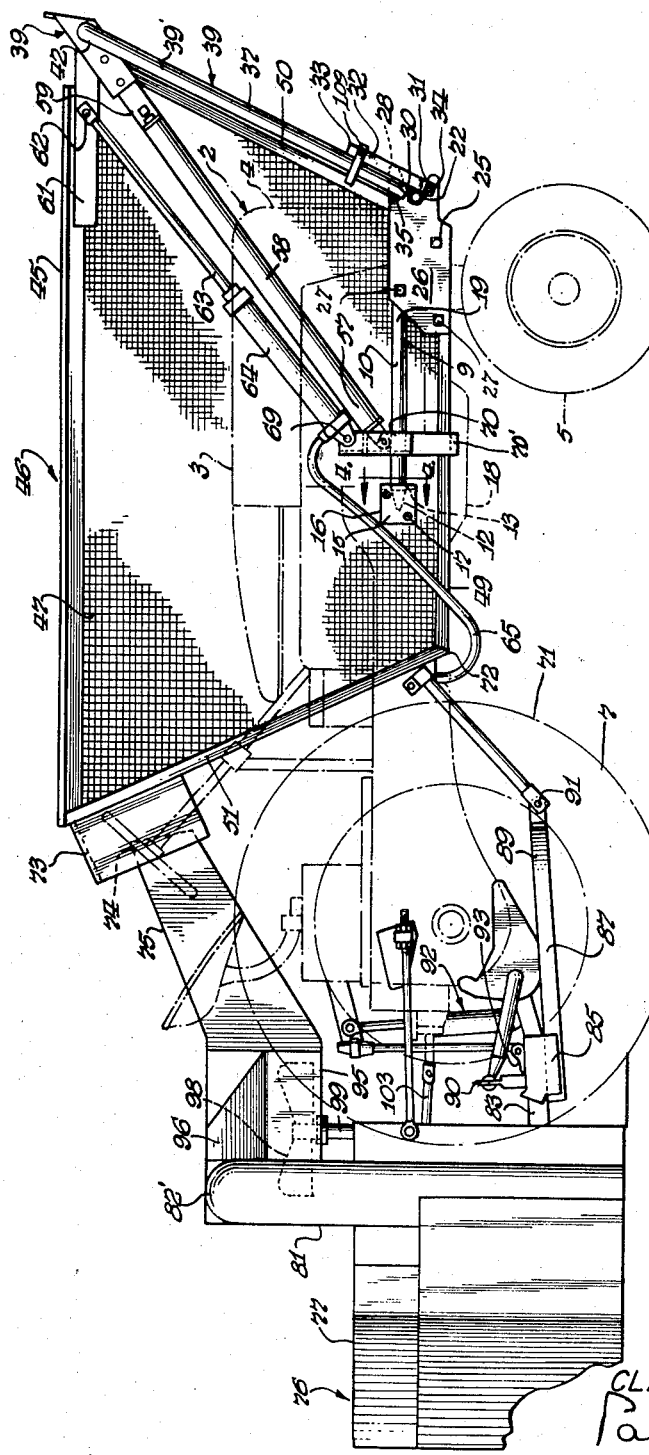
Figure 2 is a side elevational view of the combination with the tractor shown in phantom lines.

The upper ends 39′ and 40 are connected to a transverse beam member or bar 42 which extends generally parallel to the beam 22. In the present illustration the portion of the bar 42 between the upper ends 39′ and 40 is formed as an arcuate continuation of the beam 37 and projected as an extension 44 laterally outwardly leftward of the left upright beam member 38 which is located generally in the vertical plane of the longitudinal beam 10. This pivot portion 44 is disposed a substantial distance above the top of the tractor and forwardly of the bottom frame member 22 and thus as best seen in Figure 2 defines below the pivot member 44 a wagon box accommodation space whereat a wagon box may be disposed to receive cotton from the forward end of the upper side 45 of basket 46 which is elongated in a fore and aft direction and having spaced vertical fore and aft extending inboard and outboard sides 47 and 48 disposed respectively along the member 10 and outwardly of the left wheel 8 in a vertical plane between the row A and a row C immediately leftward of row A. The basket has a generally horizontal bottom 49 which is disposed at a level of about the rear axle structure to generally pass over the cotton plants, and the bottom interconnects the lateral sides and the front and rear sides 50 and 51 of the basket which converge downwardly, the front side generally paralleling the plane of the auxiliary frame structure 39 behind a diagonal beam element 52 of the structure 39 and which has an upper outer end 53 bolted as at 54 to the outboard end 55 of the extension 44 and extending diagonally downwardly inwardly therefrom and connected at its lower end 56 through the gusset plate 20 to the forward end of beam 10 and the leftward end 21 of the transverse beam 22.

The beam 10 is connected intermediate its ends to the lower rear end 57 of an upwardly and forwardly extending supplemental beam 58 which has an upper end flat plate portion 59 connected as by welding to the inboard end of the extension 44 whereby the members 58, 38 and 10 lie in a common vertical fore and aft extending plane.

Figure 1:
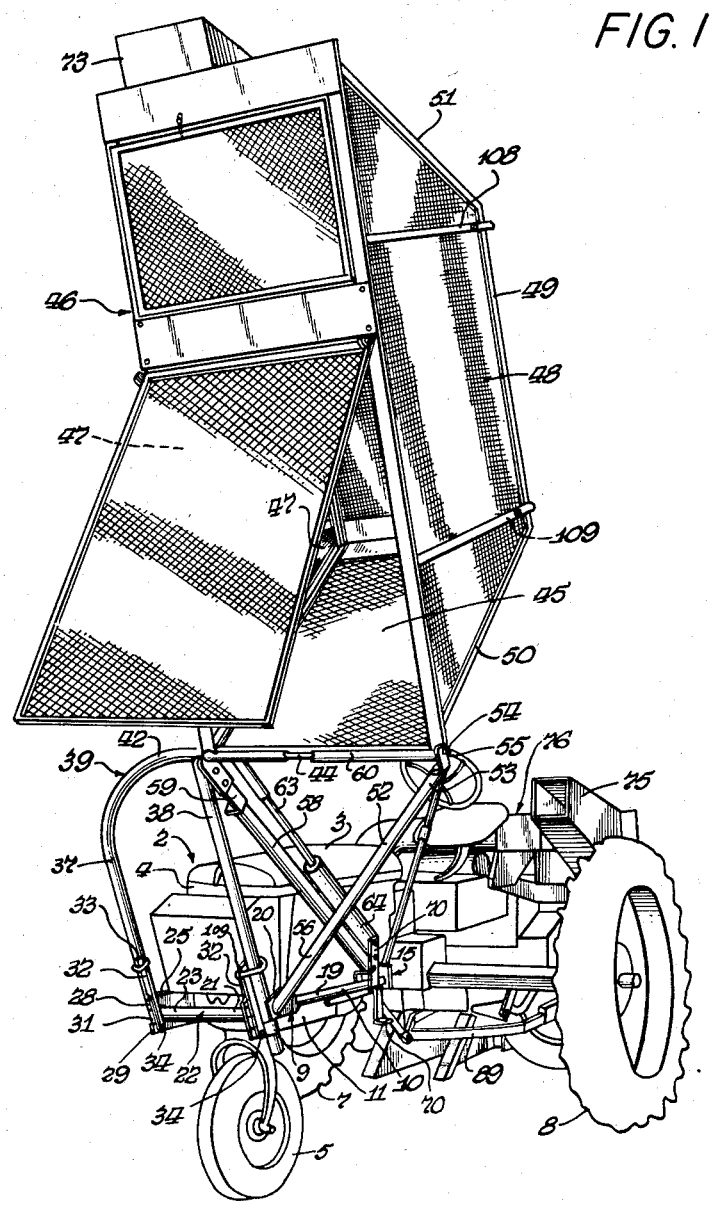
Figure 1, is a front perspective view of the tractor-harvester combination showing the basket in dumping position.

The basket is provided at the upper end of its forward side with a sleeve 60 which telescopes over the extension 44 and affords a pivot for the basket as best seen in Figure 1 on a generally horizontal axis forwardly of the tractor and substantially parallel to the axis of the rear traction wheels 7 and 8.

The basket or receptacle is provided with a rearwardly extending lever arm 61 which is pivoted at 62 to the upper end of a diagonally downwardly and rearwardly extending hydraulic motor 63 in the form of a one way piston and cylinder arrangement with the cylinder 64 provided with an hydraulic conduit 65 which has a quick detachable connection at 66 to an hydraulic power source 67 of the tractor as will be readily understood by those skilled in the art. The cylinder is pivoted as at 69 to an upstanding lug structure 70 connected to the member 10 intermediate its ends as best seen in Figure 2, said structure 70 having a depending hook 70' for supporting the basket.

The rear side of the basket extends diagonally downwardly and forwardly from a point above the left wheel 8 to in front of its forward side 71 and the angle of inclination is so chosen that the bottom rear corner 72 of the basket just clears said forward side of the left wheel upon actuation of the hydraulic motor and upward and forward swinging of the basket for dumping as seen in Figure 1.

The upper end of the rear side of the basket is provided with a rearwardly projecting inlet duct 73 communicating with the interior of the basket and telescoped over the forward and upper end 74 of a conveyor conduit 75 of a cotton picker unit 76 which is substantially identical with that shown in U. S. Patent No. 2,140,631.

Generally the picker incorporates a housing 77 which is located behind the rear axle structure rightwardly of the center line CL—CL between the same and the right wheel 7 in lateral counterbalancing relation to the basket which is located on the left side of the tractor body and in fore and aft counterbalancing relation therewith across the rear axle structure.

The housing provides a fore and aft throat or plant passage 77' aligned with the cotton plant row B and at opposite sides of the throat the picker has a pair of picker drums 78 and 79 diagrammatically shown in Figure 3 which are adapted to pick the cotton respectively from the left and right-hand sides of row B. These picker drums discharge the cotton to left and right-hand conduit branches 80 and 81 which are disposed at the left and right sides of the housing. The conduit branch 80 is disposed just to the right of plant row A and the conduit branch 81 behind the right wheel 7 between the row B and the next row D rightwardly thereof.

The housing is provided with a draft frame 82 which incorporates a pair of forwardly projecting hitch elements 83 and 84, the right hitch member 83 is disposed at the left-hand side of the inlet end of the plant passage 77' and the left hitch member 84 is disposed just to the right of row A. These hitch members telescope into mating sockets 85 and 86 on the rear ends of the legs 87 and 88 of a bail member 89 of a quick hitch linkage generally designated 90. The legs 87 and 88 converge forwardly and extend respectively along the left and right-hand sides of the rows B and A and provide means for brushing the plants of said rows outwardly.

The hitch per se forms no part of the present invention but is claimed and described in U. S. Patent 2,776,613 and for present purposes may be generally described as having a pivotal support 91 for the front end of the bail from the tractor and a lifting and lowering mechanism generally indicated 92 and connected to the rear ends of the legs of the bail and the tractor for adjusting the bail vertically.

It will be apparent that the harvester unit is attached and disconnected relative to the hitch by relative fore and aft movement between the tractor and the unit, the hitch members being releasably locked in the sockets by the locks 93 as described in said patent.

The conveyor branches 80 and 81 connect at their upper ends to a main duct 82' which overlies the housing and extends to the inlet 94 of a blower fan or pneumatic motor 95 which incorporates a housing 96 carried on an extension 97 connected to the upper portion of the housing and extending outwardly from the left side thereof at a level substantially above that of the rear axle structure and over plant row A. The blower incorporates a fan 98 having a vertical shaft 99 journalled on a bottom wall 100 of the fan housing and provided with a sheave 101 which is chain driven from a gear box 102 mounted on the upper left hand side portion of the housing just to the left of the centerline CL—CL of the tractor in order to provide an approximately straight fore and aft telescoping shaft drive 103 from the tractor power take-off 104 on the centerline CL—CL to the gear box 102 which also drives the picker components substantially as described in said Patent No. 2,140,631.

The outlet end of the fan housing is continued into the beforementioned conduit portion 75.

It will be noted that the disposition of the picker unit rearwardly of the rear axle structure and the attachment thereof to a vertically movable hitch permits the operator not only to adjust the height of the unit, but also raising it off the ground in counterbalancing relation to the basket especially where it is in dumping position as shown in Figure 1.

As seen in Figure 7 wherein the parts are indicated separated the basket is provided with several jacks 105, 106 and 107 which are extensible in order to support the basket and the frame work in the position shown for storage or assembly. The jack members 105 and 106 telescope into pipes 108 and 109 fastened to the outboard side of the basket and the member 107 telescopes into the hollow bar 38. It will be understood that each of these members 105, 106 and 107 is held in its extended or retracted position by means of a set screw.

It will be seen from the consideration of Figures 1, 2 and 3 that the latch bars 32 are maintained in locked position by means of the loops 109 on the bars 37 and 38, which loops are slidable lengthwise of these bars.

I claim:

1. In a cotton receptacle mounting for a tractor having a longitudinal portion and a transverse rear portion with widely spaced wheels, a frame structure adapted for attachment to said tractor and having members arranged to provide a receptacle receiving space at one side of said longitudinal portion of said tractor and ahead of said transverse rear portion; said structure including an extension positioned at a level above the tractor and extending transversely thereof from the plane of one side of the longitudinal portion of the tractor to a point outwardly of the wheel at that side of the tractor; a receptacle positioned within said space and having spaced sides generally paralleling said plane and forward and rear sides and a bottom interconnecting said sides and having a width greater than the transverse distance between said one wheel and the adjacent side of the tractor; said receptacle having a forward upper end portion pivoted on said extension for swinging movement in an arc paralleling said plane; said receptacle having its bottom normally positioned below the level of the tops of said rear wheels and having its rear side in partial fore and aft alignment with said one wheel and sloping upwardly and rearwardly from a point forwardly of said one wheel to an upper end above and rearwardly of the forward part of said one wheel to accommodate upward swinging movement of said receptacle; and a cotton picking unit disposed rearwardly of said transverse portion and incorporating a conveyor duct extending upwardly and forwardly therefrom over said transverse portion, and said receptacle having an inlet duct connected to said upper end of said rear side of said receptacle and telescoping over said conveyor duct; and means movably supporting said cotton picking unit from the tractor for up and down swinging movement to permit telescoping of said conveyor duct into said inlet duct of the basket for blowing crops thereinto and for withdrawing said conveyor duct from said inlet duct to accommodate swinging of said receptacle for dumping.

2. The invention according to claim 1 and said receptacle disposed at one side of the longitudinal center line of the tractor and said cotton picking unit disposed at the opposite side of said center line.

3. The invention according to claim 1 and said cotton picking unit extending below said transverse portion of said tractor.

References Cited in the file of this patent

UNITED STATES PATENTS

| | | |
|---|---|---|
| 2,214,818 | Johnston | Sept. 17, 1940 |
| 2,352,291 | Scarratt et al. | June 27, 1944 |
| 2,399,718 | Baker et al. | May 7, 1946 |
| 2,719,394 | Thomann et al. | Oct. 4, 1955 |